United States Patent
Baum et al.

[19]

[11] Patent Number: 6,086,289
[45] Date of Patent: Jul. 11, 2000

[54] MINI DRAINAGE IMMOBILIZATION SYSTEM AND METHOD

[75] Inventors: Michael W. Baum; Gary L. Barker, both of Price, Utah; William H. Hensley, Memphis, Tenn.; Donald Simpson, Tucson, Ariz.; Kenneth Henderson, Joseph, Utah

[73] Assignee: Mueller Industries, Inc., Memphis, Tenn.

[21] Appl. No.: 09/132,649

[22] Filed: Aug. 11, 1998

[51] Int. Cl.[7] ..................................................... E02D 3/12
[52] U.S. Cl. ........................... 405/263; 405/53; 405/266; 299/11
[58] Field of Search .................................. 405/263, 266, 405/267, 268, 269, 52, 53, 55, 56, 57, 58, 59, 36; 299/11, 4

[56] References Cited

U.S. PATENT DOCUMENTS

| | | |
|---|---|---|
| H1584 | 8/1996 | Moore et al. . |
| 900,683 | 10/1908 | Kirby . |
| 2,947,146 | 8/1960 | Loofbourow ............................ 405/57 |
| 2,947,147 | 8/1960 | Johnson ................................... 405/54 |
| 3,064,436 | 11/1962 | Loofbourow et al. .................... 405/57 |
| 3,340,693 | 9/1967 | Row . |
| 3,459,003 | 8/1969 | O'Neal ...................................... 299/11 |
| 3,635,034 | 1/1972 | Gardner et al. . |
| 3,704,594 | 12/1972 | Davis . |
| 4,786,211 | 11/1988 | Leutner et al. . |
| 5,141,365 | 8/1992 | Smart . |
| 5,202,033 | 4/1993 | Stanforth et al. . |
| 5,503,656 | 4/1996 | Hobby . |
| 5,599,372 | 2/1997 | Pommier . |
| 5,616,251 | 4/1997 | Batarseh . |
| 5,632,715 | 5/1997 | Harrington et al. . |
| 5,700,107 | 12/1997 | Newton . |

Primary Examiner—David Bagnell
Assistant Examiner—Frederick L. Lagman
Attorney, Agent, or Firm—Harness, Dickey & Pierce, P.L.C.

[57] ABSTRACT

The present invention relates to an apparatus and in-situ method for immobilizing mine drainage from spent mine works. This apparatus and preferred method are readily adapted for use in any mine, but particularly well-suited for mines which are located on steep hills or mountain sides having limited infrastructure to permit access for utilities and construction equipment. The present invention utilizes known technology for erecting a bulkhead in the portal of a mine drift, providing a distribution system for controlling drainage of mine water collected behind the bulkhead, mixing the mine water with a constituent to form a slurry, and introducing the slurry into the sealed mine. The present invention has the advantage of neutralizing the mine water to make discharges, if any, acceptable; precipitating dissolved metal out of the mine water within the sealed mine; and further sealing fissures that create seepage from the sealed mine.

23 Claims, 3 Drawing Sheets

MINI DRAINAGE IMMOBILIZATION SYSTEM AND METHOD

BACKGROUND OF THE INVENTION

1. Technical Field

The present invention relates to mine drainage immobilization, and more particularly to an apparatus and in-situ method for immobilizing water collected within spent and/or abandoned mine works.

2. Description Of Related Art

It is a well known phenomenon that water can and does collect within underground mines. As this water collects, it has a tendency to leach the soluble compounds within the adjacent ground and/or ore body. For example, many of the copper and lead mines in California are formed through an ore body which is high in sulfides. As such, the sulfides have a tendency to leach out of the adjacent ground and into the water collecting within the mine workings, thereby generating a highly acidic mine drainage. This highly acidic mine drainage, in turn, has a tendency to dissolve the residual metals, such as copper and lead, into the mine drainage. Because such mine water is highly acidic and contains a relatively high concentration of metal, there is a high potential for pollution of adjacent streams, rivers and lakes resulting from the discharge thereof.

Mine drainage is recognized as a potential environmental concern attracting the attention of both industry and government in the United States and throughout the world. Many processes have been proposed for purifying such acid mine drainage after it is discharged from the mine, but before it is allowed to enter the nearby waterways. Normally, these processes require that the water discharged from the underground mine be collected on the surface in large retention ponds at which point additives are injected into the retained waters in attempt to neutralize this drainage. For example, highly acidic mine drainage will be injected with a suitable alkaline materials to raise the pH factor to a near neutral state. Once the mine drainage has been neutralized, it is transported to a secondary settling pool where the metals and other pollutants are allowed to precipitate out of the water. Only after these steps is the treated water considered suitable for discharge into the environment.

This procedure has recognized deficiencies. For example, over a period of time, the retention pond and settling pool have a tendency to fill with the precipitated minerals and other material, thereby requiring removal thereof. However, due to the chemical makeup of these precipitants, specialized handling and disposal is often required. As such, the prior art methods of treating acid mine drainage often requires a large amount of surface area adjacent to the underground mine which is suitable for forming the retention ponds and settling pools. In addition, while some mine sites lend themselves to these requirements, many of the mine sites, particularly in very mountainous terrain, do not have the requisite surface area available. Furthermore, heavy industrial equipment is required at such sites many of which are remote with no electricity or other infrastructure available for building these facilities, as well as removal and disposal of the precipitated wastes.

SUMMARY OF THE INVENTION

The present invention relates to an apparatus and in-situ method for immobilizing underground mine drainage. More specifically, the present invention utilizes a controlled extraction of the water collecting within a sealed mine, processes or treats the extracted water to form a slurry having a pH factor which is opposite the pH factor of the mine water and introduces the slurry into the sealed mine. The slurry which is introduced into the sealed mine has a three-fold effect—neutralization of the mine water, precipitation of the dissolved metal within the mine and sealing of the fissures and natural passageway to prevent seepage from bedrock in the vicinity of the mine and possibly subsequent infusion of water into the mine to further eliminate drainage therefrom. Thus, by substantially preventing drainage of water from the mine workings, the need to further treat and remove such hazardous wastes on the surface, as well as subsequent disposal thereof, is eliminated.

It is, therefore, a general object of the present invention to provide an apparatus and method for collecting water within sealed mine workings, and further processing to produce a slurry and introducing the slurry into the sealed mine to treat the mine drainage, whereby any hazardous wastes contained in the mine drainage is confined within the mine.

An additional object of the present invention is to provide an apparatus and method for remediating mine drainage which is readily adaptable to adverse terrain, such as steep mountainous areas where land surface area and/or infrastructure such as roads and electrical power are extremely limited or unavailable.

A further object of the present invention is to provide an apparatus and method which utilizes standard equipment and which can be readily monitored and maintained during the remediation process.

Still another object of the present invention is to provide an apparatus and method which is in part transportable, and thus can be readily adaptable for use at multiple underground mine locations.

BRIEF DESCRIPTION OF THE DRAWINGS

The advantages of the present invention will become apparent to one of ordinary skill in the art by reading the following specification and subjoined claims and referencing the following drawings in which:

DETAILED DESCRIPTION OF THE PREFERRED EMBODIMENT

Figure 1:
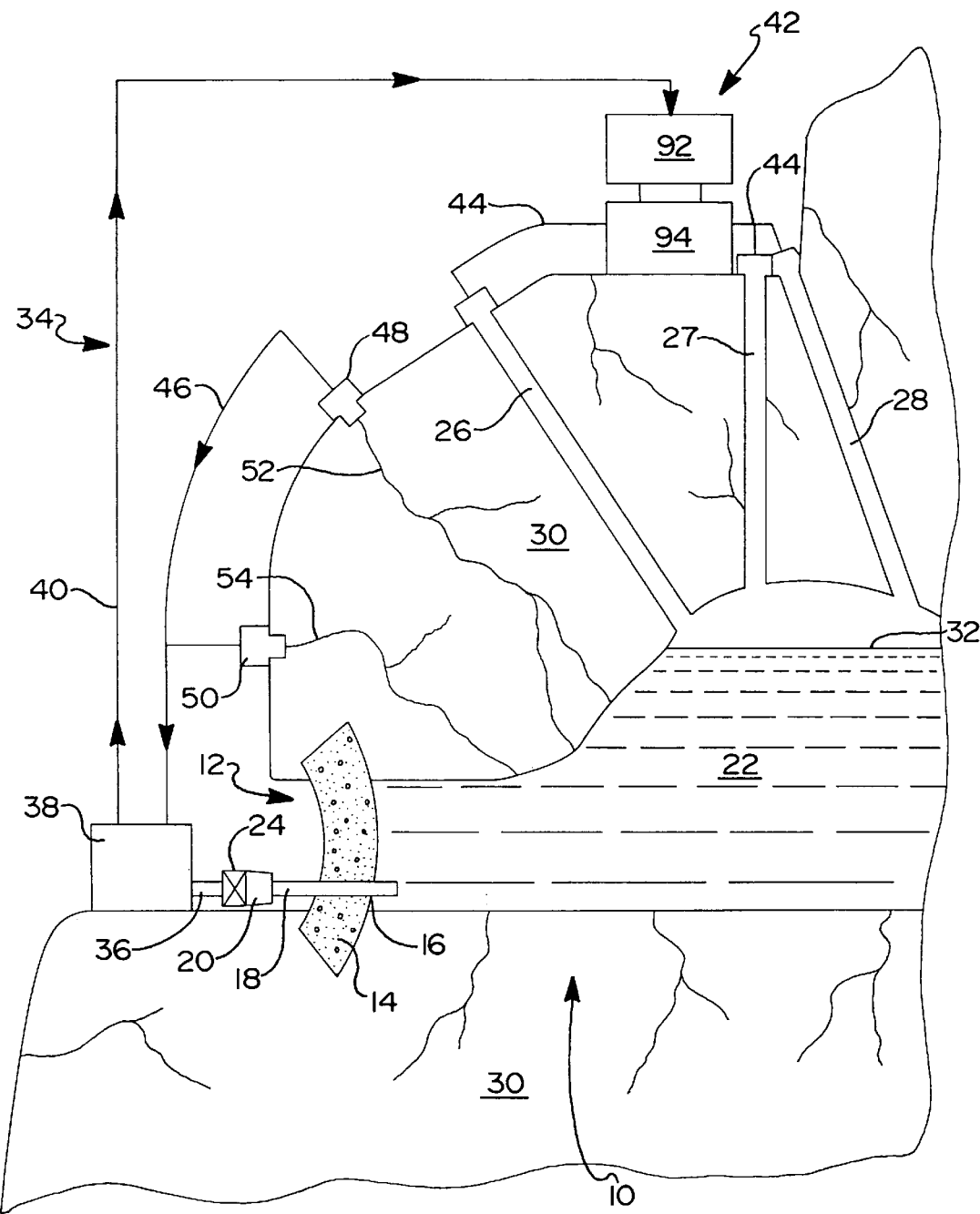
FIG. 1 is a schematic cross-section of a mine opening or entrance in which the present invention is employed to immobilize mine drainage therefrom.

The present invention relates to an apparatus and in-situ method for immobilizing acid drainage from spent mine workings such as a mine drift 10 formed generally horizontally in the face of a hill or mountain side. The present invention is utilized to prevent the discharge of mine water from the portal 12 thereof. Typically, this is acidic water (low pH water) and may contain unusually high concentrations of iron or other metals, such as copper, lead, zinc, cadmium, etc.

Initially, a cement bulkhead 14 is constructed near the portal 12 of drift mine 10 with the intent of providing a sealed mine in which mine water accumulates behind the bulkhead 14 and is prevented from leaking out of the mine. However, it is not unusual for seepages to form near the mine workings as pressure is created by the head of water which forces the water through naturally occurring passageways or fissures 52, 54. Such seepages appear as springs in the mountain sides. An access bore 16 is formed through bulkhead 14 and provided with a discharge pipe 18 to permit controlled fluid communication across bulkhead 14 such that the amount of mine water extracted from the drift mine 10 can be controlled. A valve 24 is also operably disposed in discharge pipe 18 for controlling flow therethrough.

Figure 2:
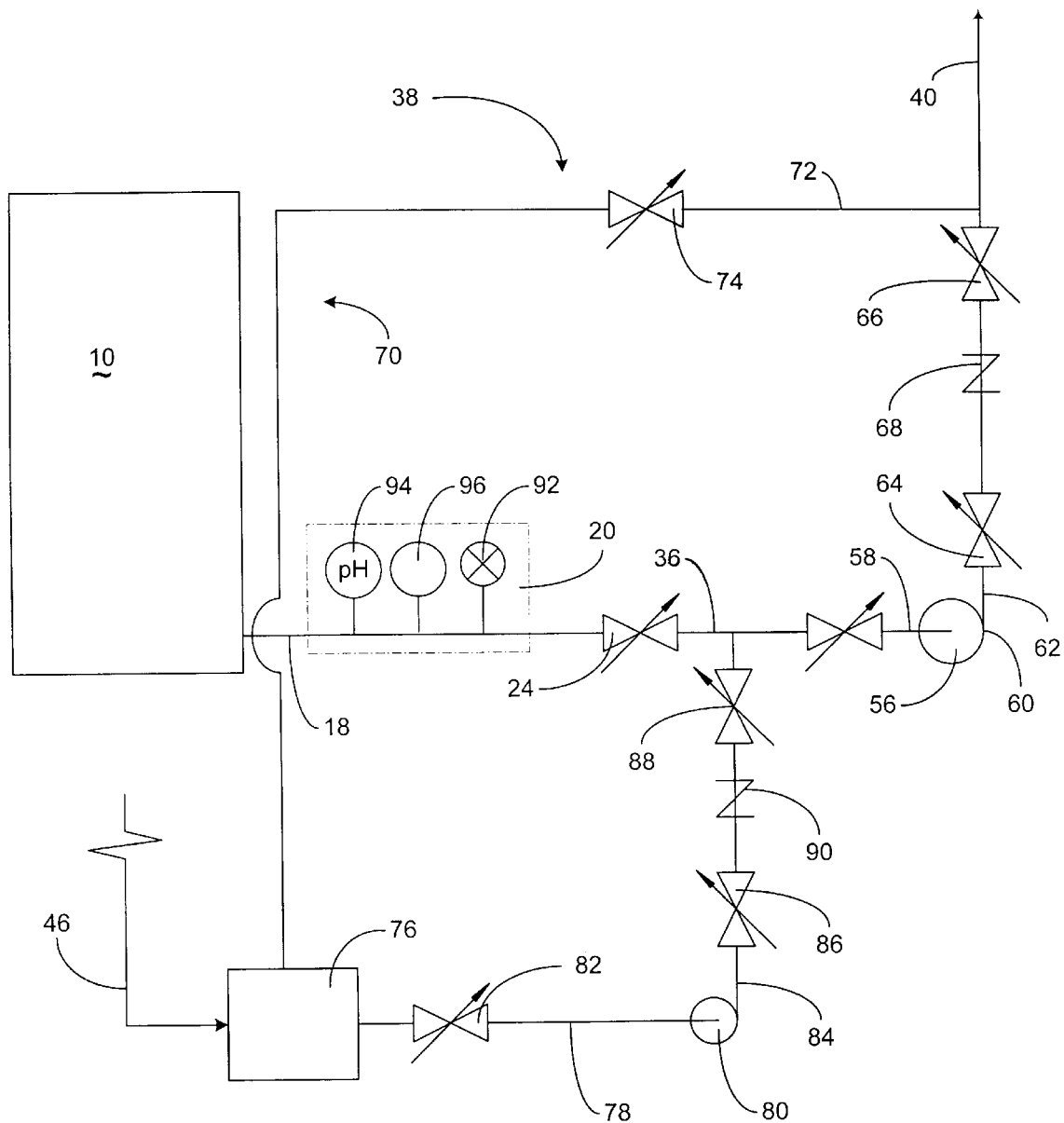
FIG. 2 is a schematic drawing of the pump control used in the present invention.

With particular reference to FIG. 2, a monitoring device 20 is operably coupled to discharge pipe 18 and preferably includes a pressure gauge 92, a pH meter 94 and a spectrometer 96 or any other suitable apparatus as commonly used in analytical chemistry for monitoring the water pressure, pH factor and mineral properties of the mine water 22 collecting behind bulkhead 14. In this regard, monitoring device 20 may be as simple as a pressure gauge and a spigot accessible for collecting water surplus, or as sophisticated as an automated pressure/chemical analysis instrument.

The mine drift 10 is further prepared by drilling primary injection bores 26, 27, 28 through the bedrock 30 which open into mine drift 10 at a point immediately above the water line 32 of the mine water 22 collected therein behind bulkhead 14. A distribution system 34 is operably coupled between the outlet 36 of discharge pipe 18 and primary injection bores 26, 27, 28. More specifically, distribution system 34 includes pumping station 38 operably coupled to outlet 36, transport pipeline 40 extending from pumping station 38 to mixing station 42, and primary injection pipeline 44 providing fluid communication from mixing station 42 to primary injection bore 26, 27, 28. A secondary collection pipeline 46 extending from fluid collectors 48, 50 which are located at naturally occurring passageways such as fissures 52, 54 in the adjacent bedrock 30 to sump circuit 70 of distribution system 34. The seepage from fissures 52, 54 is collected by collectors 48, 50 and then transported through pipeline 46 to collection sump 76 where low-head pump 80 pumps these solutions into the main pump suction pipe 36.

With reference now to FIG. 2, a detailed schematic diagram of the pump station 38 is illustrated. Pump station 38 include a main pump 56 having an inlet 58 coupled to the outlet 36 of discharge pipe 18, and an outlet 60 coupled to an inlet 62 of transport pipeline 40 with a pair of butterfly valves 64, 66 and a check valve 68 located therein. Pump station 38 further includes a sump circuit 70 for draining transport pipeline 40 if necessary, and for collecting mine drainage emanating from sources other than portal 12 or overflow from distribution system 34. More specifically, sump circuit 70 includes return pipe 72 fluidly coupled between transport pipeline 40 and sump 76 with butterfly valve 74 located therein, open pipeline 46 from collectors 48, 50 to sump 76, an inlet 78 fluidly coupled between sump 76 and level switch operationed sump pump 80 with butterfly valve 82 located therein, and an outlet 84 fluidly coupled between sump pump 80 and discharge pipe 18 with a pair of butterfly valves 86, 88 and check valve 90 located therein. As presently preferred, the pumping station 38 is configured to be readily assembled and disassembled at the portal of a mine drift so as to be conveniently transported to multiple mine locations.

With reference to FIG. 1, mixing station 42 provides the functions of receiving and storing mine water pumped from mine drift 10 by pumping station 38 to a location above portal 12, mixing the mine water 22 with appropriate constituent minerals to form a slurrified neutralizing mixture and discharging the slurrified neutralizing mixture into the injection pipelines 44. More specifically, the constituent minerals should be readily soluble and/or suspendable in the mine water and have a pH factor which is opposite the pH factor of the mine water relative to a neutral pH (i.e. 7.0 pH). As presently preferred, mixing station 42 includes a solution storage tank or hopper 92 capable of holding the constituent minerals loaded therein and mine water discharged from transport pipeline 40. Mine water is injected into hopper 92 where it mixes with the constituent material to form a slurrified neutralizing mixture. The mixing station 42 further includes a baffled discharge trough 94 which is fluidly coupled between hopper 92 and primary injection pipelines 44. The slurrified neutralizing mixture is discharged from hopper 92 into baffled trough 94 to further mix the mine water and constituent minerals.

Constituent minerals or agents may be loaded into hopper 92 by any convenient and readily adaptable means including a front end loader, a conveyor system, a variable rate feed bin, or a feed pump if a liquid constituent is used to change the pH to opposite of the mine water. Furthermore, mixing station 42 is preferably arranged such that mine water pumped into hopper 92 washes over the constituent mineral down into baffled trough 94 where it is directed through primary injection pipelines 44 into primary injection bores 26, 27, 28. In this way, mixing station 42 is gravity driven and does not require a pump or the like, thereby eliminating the need for electrical service generators or pumps at the elevated site. The mixing station 42, like the pumping station 38, is configured to be readily assembled and disassembled at a site above the portal 12 of the mine drift 10 so as to be conveniently transported to multiple mine locations.

Figure 3:
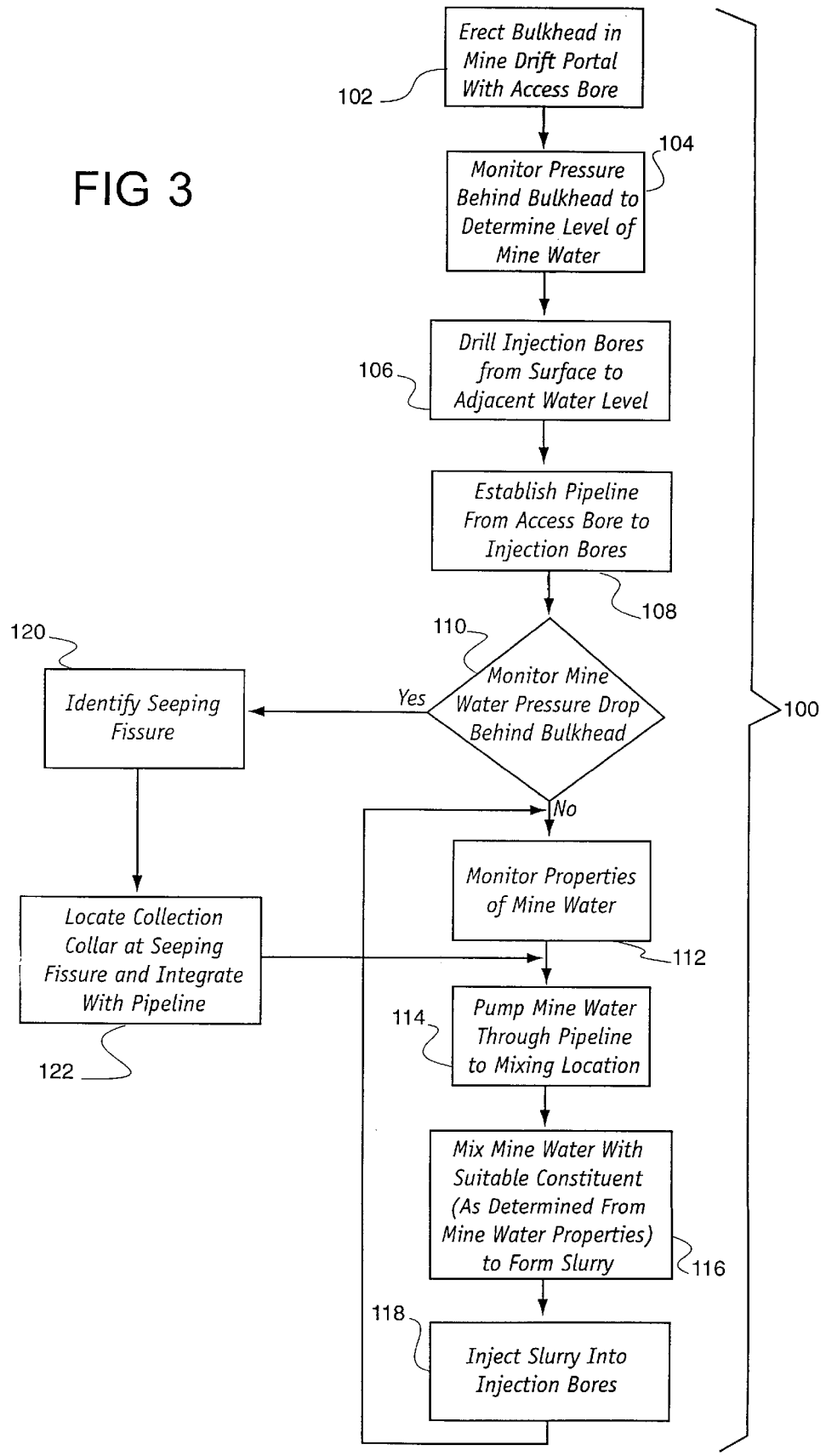
FIG. 3 is a flow chart illustrating the steps utilized in the method of the present invention to immobilize mine drainage.

With reference now to FIG. 3, the in-situ method for immobilizing acid drainage in accordance with the present invention is illustrated in flow chart 100 and further described hereafter. Initially, bulkhead 14 is erected in portal 12 of mine drift 10 as indicated at block 102 such that mine water 22 collects therebehind until a pool is formed. At this point, valve 24 has been closed to allow such accumulation of mine water and the water pressure behind bulkhead 14 is monitored, and the water level of the mine water is estimated as a function of the pressure as indicated at block 104. Once the mine water 22 pools to water line 32, primary injection bores 26, 27, 28 are drilled through the bedrock to various points adjacent the water level as indicated at block 106. The distribution system 34 is erected to provide fluid communication between the sealed mine 10 across the bulkhead 14 to primary injection bores 26, 27, 28 as indicated at block 108.

At this point valve 24 is opened, thereby allowing mine water to be transported through discharge pipe 18 into distribution system 34 in a controlled manner. As the mine water drainage is transported through distribution system 34, monitoring device 20 continues to monitor the pressure, pH factor and mineral composition of the mine drainage water as indicated at blocks 110, 112. Knowing the current parameters (i.e. the pH factor and mineral composition) of the mine drainage water permits adjustment of the amount of constituent mineral added to the mine drainage to create a slurry. The water is pumped by pumping station 38 which imparts sufficient head to transport the mine drainage through transport pipeline 40 up to mixing station 42 as indicated at block 114. A slurry of mine water and constituent mineral is created at mixing station 42 as indicated at block 116.

From mixing station 42 the slurry is transported through primary injection pipeline 44 and into injection bores 26, 27, 28 such that the slurry is introduced into mine drift 10 where it ultimately reaches mine water 22 collected therein as indicated at block 118. The slurry is mixed to have a pH factor opposite that of the mine drainage water relative to a neutral pH factor (i.e. 7.0 pH) so as to neutralize the mine water. In the process, the neutralization of the mine water causes the iron and other metals dissolved therein to precipitate out as solids. These solids as well as any solids created by chemical reactions settle within mine drift 10 and seal fissures and other naturally occurring passageways therein.

During the immobilization process, the pressure of mine water behind bulkhead 14 is also continually monitored to detect any significant drop therein as indicated at block 110. Such an event typically identifies the existence of a secondary discharge point through a naturally occurring passageway or fissures 52, 54 which are easily identified through visual inspection of the area adjacent the mine drift 10 as indicated at block 120. Once the secondary discharge point is identified, collectors 48, 50 can be located at fissures 52, 54 and fluidly coupled to secondary pipeline 46 for collecting, transporting and introducing the seepage to the pumping station 38 as indicated at block 122.

In addition to solids that are injected into the mine workings, the slurry constituent may be selected such that its reaction with the mine water collected behind bulkhead 14 initiates the growth of mineral crystals which further facilitate sealing the fissures and naturally occurring passageways in and around the mine 10 to seal fissures 52, 54, thereby eliminating the seepage therefrom.

While the present invention is believed to have applicability to a wide range of mine configurations, the present invention has shown to be particularly effective in treating copper mine drifts located in the Sierra-Nevada mountain range in the Western United States. More particularly, the ore bodies of these mine drifts are high in sulfides such that the mine drainage emanating therefrom is highly acidic (on the order of 2.0 pH) and may contain significant amounts of copper, lead and/or other metals. In this situation, a suitable constituent mineral of limestone, or alternately fly ash, soda ash or caustic soda, is used to mix with the highly acidic mine drainage water to form the slurry which is introduction into the mine drift. The reaction between the limestone and the naturally-occurring sulfuric acid in the mine drainage creates crystals of mineral compounds such as calcium sulfate (gypsum) which are beneficial for sealing the fissures and naturally occurring passageways in the mine.

The beneficial effects of the present invention are believed to be three-fold. First, the injection of the slurry having an opposite pH factor relative to the mine drainage has a neutralizing effect on the pool of mine water collected behind the bulkhead in the mine drift. Secondly, the present invention facilitates precipitation within the mine drift of any dissolved metals such as copper and lead from the mine drainage. Since this is an in-situ precipitation, the solids deposited within the mine remain at their origin, thereby eliminating the need to treat or otherwise handle and dispose of by-products of the acid mine drainage. Thirdly, the solids which precipitate out of the mine water, as well as the crystals which grow from the reaction of the mine water and the slurry, have a tendency to fill up and seal off fissures and naturally-occurring passageways, thereby preventing discharge of water from the mine drift. Thus, it is believed that after a sufficient period of time the mine drift becomes semi-impervious to the leakage of ground water from the mine drift, such that the distribution system may be removed and/or relocated to other mines for similar processing.

The present invention is therefore well adapted to carry out the aforementioned objects of the present invention. While presently preferred embodiments of the invention are given for purpose of disclosure, numerous changes, modifications and variations will be apparent to one of ordinary skill in the art and which are encompassed within the spirit and scope of the present invention as hereafter claimed.

What is claimed is:

1. A method for immobilizing mine drainage from an underground mine constructed in a bedrock, the method comprising the steps of:

erecting a bulkhead in the mine to provide a sealed mine;

accumulating mine water in said sealed mine behind said bulkhead;

drilling an injection bore through the bedrock from a point above the bulkhead into said sealed mine;

determining a pH factor for said mine water;

extracting an amount of said mine water from said sealed mine;

forming a slurry by mixing said amount of mine water with a constituent such that said slurry has a pH factor which is opposite said pH factor of said mine water; and introducing said slurry into said sealed mine through said injection bore.

2. The method for immobilizing mine drainage as set forth in claim 1 wherein the step of extracting an amount of said mine water further comprises the steps of:

establishing fluid communication between said sealed mine and said injection bore across said bulkhead; and pumping said amount of mine water from said sealed mine.

3. The method for immobilizing mine drainage as set forth in claim 2 wherein the step of forming a slurry comprises the step of depositing said constituent in a hopper tank and discharging said amount of mine water into said hopper tank such that said amount of mine water and said constituent are mixed to form said slurry.

4. The method for immobilizing mine drainage as set forth in claim 3 wherein the step of forming a slurry further comprises passing said slurry through a baffled trough prior to introducing said slurry through said injection bore.

5. The method for immobilizing mine drainage as set forth in claim 1 and further comprising the steps of:

determining a water level of the mine water accumulated within said sealed mine; and drilling said injection bore through the bedrock to a point adjacent said level of water in said sealed mine.

6. The method for immobilizing mine drainage as set forth in claim 5 wherein said step of determining a water level comprises determining a water pressure of the mine water accumulated within said sealed mine and estimating said water level in said sealed mine as a function of said water pressure.

7. The method for immobilizing mine drainage as set forth in claim 1 wherein the step of drilling said injection bore further comprises drilling a plurality of injection bores through the bedrock from a point above said bulkhead into various locations in said sealed mine.

8. The method for immobilizing mine drainage as set forth in claim 1 and further comprising the steps of:

identifying a secondary discharge point of mine water from said sealed mine;

collecting said mine water at said secondary discharge point; and adding said collected mine water to said amount of water for forming said slurry.

9. A method for immobilizing mine drainage from an underground mine constructed in a rock, the method comprising the steps of:

erecting a bulkhead including a valved discharge pipe in the mine to provide a sealed mine;

accumulating mine water in said sealed mine behind said bulkhead;

determining a water level of the mine water accumulated in said sealed mine;

drilling a plurality of injection bores through the bedrock from a point above said bulkhead into various locations in said sealed mine;

determining a pH factor for said mine water;

pumping an amount of the mine water from said sealed mine through said discharge pipe;

mixing said amount of mine water with a constituent to form a slurry having a pH factor which is opposite said pH factor of said mine water; and introducing said slurry into the mine through said injection bore.

10. The method for immobilizing mine drainage as set forth in claim 9 and further comprising the steps of:

identifying a secondary discharge point of mine water from said sealed mine;

collecting said mine water at said secondary discharge point; and adding said collected mine water to said amount of water for forming said slurry.

11. A mine drainage immobilization system for controlling drainage of mine water from a mine constructed in a bedrock comprising:

a bulkhead erected in the mine to provide a sealed mine;

a discharge pipe providing fluid communication across said bulkhead;

an injection bore formed through the bedrock from a point above said bulkhead into said sealed mine;

a distribution system including a pumping station for imparting sufficient energy to extract an amount of mine water from said discharge pipe and transport said amount of mine water to said injection bore, a monitoring device for determining a pH factor of said amount of water, and a mixing station for mixing said amount of mine water with a constituent to form a slurry having a pH factor which is opposite said pH factor of said mine water, said distribution system having an inlet fluidly coupled to said discharge pipe and an outlet fluidly coupled to said injection bore to provide fluid communication therebetween such that said slurry is introduced into said sealed mine.

12. The mine drainage immobilization system of claim 11 wherein said distribution system further comprises a collector located at a secondary discharge point and a secondary pipeline providing fluid communication from said secondary discharge point to said pumping station.

13. The mine drainage immobilization system of claim 11 wherein said distribution system further comprises a pump having an inlet fluidly coupled to said discharge pipe, and a transport pipeline having an inlet fluidly coupled to an outlet of said pump and an outlet fluidly coupled to said mixing station.

14. The mine drainage immobilization system of claim 13 wherein said distribution system further comprises a check valve interdisposed between said pump outlet and said transport pipeline inlet for preventing back flow from said transport pipeline into said pump.

15. The mine drainage immobilization system of claim 13 wherein said distribution system further comprises a sump circuit having an inlet fluidly coupled to said transport pipeline and an outlet fluidly coupled to said pump inlet.

16. The mine drainage immobilization system of claim 15 wherein said sump circuit further comprises a sump having an inlet fluidly coupled to said transport pipeline and a sump pump having an inlet fluidly coupled to an outlet of said sump and an outlet fluidly coupled to said pump inlet.

17. The mine drainage immobilization system of claim 16 wherein said sump circuit further comprises a check valve interdisposed between said sump pump outlet and said pump inlet for preventing flow from said discharge pipe to said sump circuit.

18. The mine drainage immobilization system of claim 13 wherein said distribution system further comprises a hopper tank containing said constituent fluidly coupled to said transport pipeline between said discharge pipe and said injection bore.

19. The mine drainage immobilization system of claim 18 wherein said distribution system further comprises a baffled trough fluidly coupled to said transport pipeline between said hopper tank and said injection bore.

20. The mine drainage immobilization system of claim 11 wherein said monitoring device is operable to determine a water pressure for mine water accumulated in said sealed mine behind said bulkhead.

21. The mine drainage immobilization system of claim 11 wherein said monitoring device is operable to determine said pH factor of the mine water accumulated in said sealed mine behind said bulkhead.

22. A mine drainage immobilization system for controlling drainage of mine water from a portal of a mine constructed in an bedrock comprising:

a bulkhead erected in the mine to provide a sealed mine;

a discharge pipe providing fluid communication across said bulkhead;

a monitoring device operably coupled to said discharge pipe for determining a pH factor and a water pressure of the mine water accumulated in said sealed mine;

an injection bore formed through the bedrock from a point above said bulkhead into said sealed mine;

a transport pipeline having an inlet fluidly coupled to said discharge pipe and an outlet fluidly coupled to said injection bore;

a pumping station including a pump having an inlet fluidly coupled to a discharge pipe outlet and an outlet fluidly coupled to a transport pipeline inlet, said pump imparting sufficient energy to transport said amount of mine water to said injection bore;

a mixing station including a hopper tank having an inlet fluidly coupled to a transport pipeline outlet and a baffled trough fluidly coupled to said hopper tank, said hopper tank having a constituent therein such that said amount of mine water is discharged into said hopper tank, mixed with said constituent to form a slurry having a pH factor which is opposite said pH factor of said mine water, and discharged into said baffled trough for further mixing said slurry; and an injection pipeline having an inlet fluidly coupled to a baffled trough outlet and an outlet fluidly coupled to said injection bore to introduce said slurry into said sealed mine.

23. The mine drainage immobilization system of claim 22 further comprising:

a collector located at a secondary discharge point; and a secondary pipeline having an inlet coupled to said collector and an outlet coupled to said pumping station to provide fluid communication therebetween.

* * * * *

UNITED STATES PATENT AND TRADEMARK OFFICE
CERTIFICATE OF CORRECTION

PATENT NO. : 6,086,289
DATED : July 11, 2000
INVENTOR(S) : Michael W. Baum, et al.

It is certified that error appears in the above-identified patent and that said Letters Patent is hereby corrected as shown below:

On the Title Page, in the Title;
Executed Declaration & Power Of Attorney, page 1;
"MINI" should be -- MINE --;

Column 1, line 1;
Executed Declaration & Power Of Attorney, page 1;
"MINI" should be -- MINE --.

Signed and Sealed this

Seventeenth Day of April, 2001

Attest:

NICHOLAS P. GODICI

Attesting Officer     Acting Director of the United States Patent and Trademark Office